(12) United States Patent
Canales

(10) Patent No.: US 7,546,704 B1
(45) Date of Patent: Jun. 16, 2009

(54) FISHING RIG WITH A SINKER LIFTER AND A SINKER WEIGHT

(76) Inventor: Ricardo Canales, 3663 Figueroa St., La Canada Flintridge, CA (US) 91011

( * ) Notice: Subject to any disclaimer, the term of this patent is extended or adjusted under 35 U.S.C. 154(b) by 0 days.

(21) Appl. No.: 12/157,638

(22) Filed: Jun. 11, 2008

(51) Int. Cl.
*A01K 95/00* (2006.01)

(52) U.S. Cl. ......................................... 43/44.9

(58) Field of Classification Search ............... 43/44.87, 43/44.9, 44.91
See application file for complete search history.

(56) References Cited

U.S. PATENT DOCUMENTS

| | | | |
|---|---|---|---|
| 2,177,007 A | 10/1939 | Smith | |
| 2,230,456 A | 2/1941 | Henze | |
| 3,803,749 A | 4/1974 | Boyum | |
| 4,202,128 A | 5/1980 | Hill et al. | |
| 4,615,136 A | 10/1986 | Bank | |
| 4,803,798 A | 2/1989 | Hannah | |
| 4,965,956 A | 10/1990 | Bethel | |
| 5,027,545 A | 7/1991 | Lowrie et al. | |
| 5,197,220 A | 3/1993 | Gibbs et al. | |
| 5,239,770 A | 8/1993 | Kohus | |
| 5,381,622 A | 1/1995 | Tregre | |
| 5,784,828 A | 7/1998 | Thompson | |
| D527,437 S | 8/2006 | Bosse et al. | |
| 7,162,830 B2 | 1/2007 | Sims | |
| 2006/0096156 A1* | 5/2006 | Griffero | 43/43.16 |

* cited by examiner

*Primary Examiner*—T. Nguyen
(74) *Attorney, Agent, or Firm*—Wagner, Anderson & Bright, LLP; Roy L Anderson

(57) ABSTRACT

A combination of weights for fishing while using a casting reel with a rig attached to a fishing line relies upon a first sinker lifter having a forward streamlined surface shape, an internal bore through which the fishing line can be threaded and a rear cavity and a second sinker weight having a second internal bore through which the fishing line can be threaded and can be held within the rear cavity of the sinker lifter, the sinker lifter having a specific gravity greater than, but approximately, 1.0 while the sinker weight has a specific gravity substantially greater than 1.0.

15 Claims, 5 Drawing Sheets

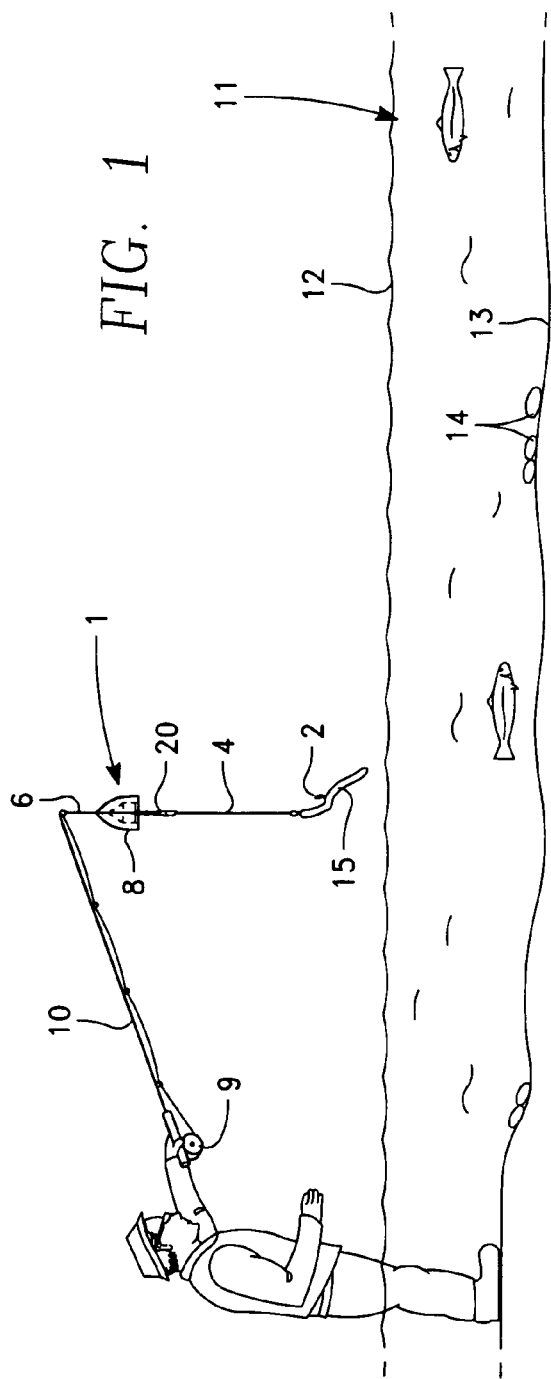
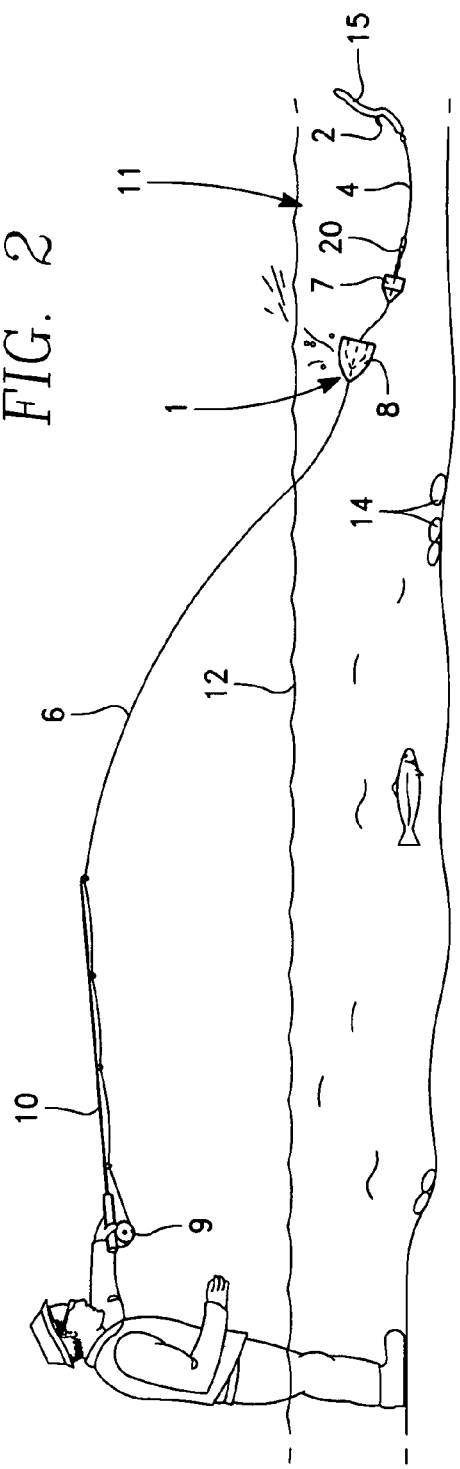
FIG. 1
FIG. 2

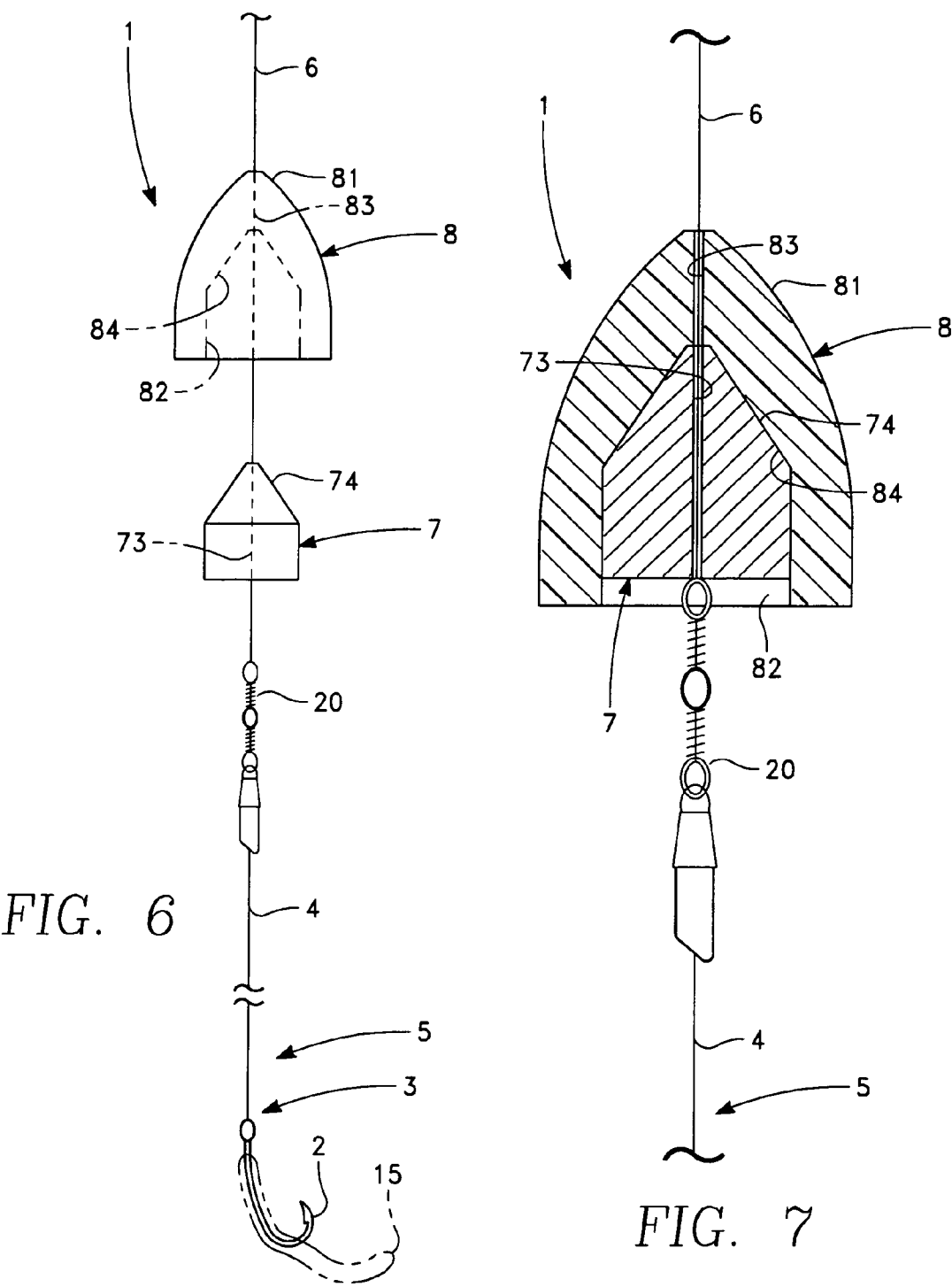

FISHING RIG WITH A SINKER LIFTER AND A SINKER WEIGHT

FIELD OF THE INVENTION

The present invention is in the field of weights for fishing while using a casting reel with a rig attached to a fishing line.

BACKGROUND OF THE INVENTION

Fisherman using a casting reel can use a variety of rigs to fish depending upon where they are fishing and what they are fishing for. When a fisherman wants a hook to be at or near the bottom of a body of water, the rig must be weighted to get it to the bottom, and then the fisherman hopes that the rig can be retrieved without becoming entangled in underwater obstructions such as rocks, weeds or logs.

The present invention is directed to providing a novel rig for fishing using a casting reel that allows a fisherman greater precision during casting, which increases the likelihood of success of a skilled fisherman, while making it less likely that the rig will be lost on the bottom as it is being retrieved.

SUMMARY OF THE INVENTION

The present invention is generally directed to a combination of weights for fishing while using a casting reel with a rig attached to a fishing line in which a sinker lifter has a forward streamlined surface shape, an internal bore through which the fishing line can be threaded and a rear cavity while a sinker weight has a second internal bore through which the fishing line can be threaded and can be held within the rear cavity of the sinker lifter, the sinker lifter having a specific gravity greater than, but approximately, 1.0, while the sinker weight has a specific gravity substantially greater than 1.0.

In a first, separate group of aspects of the present invention, the sinker weight can be held substantially completely within the rear cavity of the sinker lifter and have a mating surface designed to fit within a corresponding mating surface of the rear cavity of the sinker lifter.

In a second, separate group of aspects of the present invention, a rig for use on a fishing line has a hook, leader line and the sinker weight and sinker lifter with the sinker weight being located between the leader and the sinker lifer. When the fishing line is retrieved, the sinker lifter (which can have a forward surface shaped like a bullet) lifts the rig from a bottom surface thereby protecting the rig from obstacles on the bottom surface.

In a third, separate group of aspects of the present invention, once a rig according to the present invention is cast into a body of water, it is allowed to sink to the bottom and then the rig is retrieved during which the sinker lifter lifts the rig from the bottom surface when the fishing line is retrieved thereby protecting the rig from obstacles on the bottom surface while the sinker weight is held in the rear cavity of the sinker lifter.

Accordingly, it is a primary object of the present invention to provide an improved, combination of weights for fishing while using a casting reel with a rig.

This and further objects and advantages will be apparent to those skilled in the art in connection with the drawings and the detailed description of the invention set forth below.

BRIEF DESCRIPTION OF THE DRAWINGS

FIG. 1 illustrates a rig according to the present invention as it is being prepared to be cast into a body of water.

FIG. 2 illustrates the rig of FIG. 1 after it has been cast and come into contact with a body of water and is in the process of sinking to the bottom.

FIG. 6 is an exploded view of the sinker weight and sinker lifter of FIG. 1 showing the sinker weight and sinker lifter separated from each other and a swivel of the leader and FIG. 8 is a cross sectional views of the sinker weight and sinker lifter.

FIG. 7 is a cross sectional view of the sinker weight and sinker lifter of FIG. 1 when the sinker weight is inside of the sinker lifter.

DETAILED DESCRIPTION OF THE INVENTION

Figure 3:
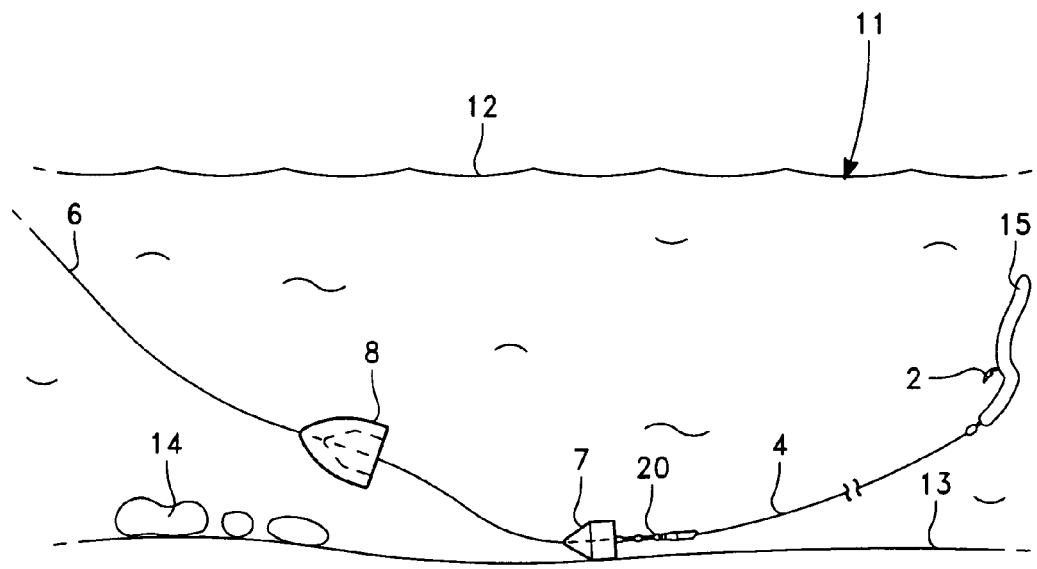
FIG. 3 illustrates the rig of FIG. 2 as it sinks to the bottom.

The present invention will now be discussed in connection with a preferred embodiment shown in FIGS. 1-8.

In the Figures and the following more detailed description, numerals indicate various features of the invention, with like numerals referring to like features throughout both the drawings and the description. Although the Figures are described in greater detail below, the following is a glossary of the elements identified in the Figures.

| | |
|---|---|
| 1 | rig |
| 2 | hook |
| 3 | hook end |
| 4 | leader line |
| 5 | fishing line end |
| 6 | fishing line |
| 7 | sinker weight |
| 8 | sinker lifter |
| 9 | casting reel |
| 10 | fishing pole |
| 11 | body of water |
| 12 | surface of water |
| 13 | bottom |
| 14 | rock |
| 15 | bait |
| 20 | swivel |
| 73 | internal bore of sinker weight 7 |
| 74 | mating surface of sinker weight 7 |
| 81 | streamlined bullet shape front end of sinker lifter 8 |
| 82 | rear cavity of sinker lifter 8 |
| 83 | internal bore of sinker lifter 8 |
| 84 | mating surface of sinker lifter 8 |

FIG. 1 illustrates a rig according to the present invention, generally designated as 1, as it is about to be cast into a body of water 11. As illustrated in FIG. 1, rig 1 is lower than the tip of fishing pole 10 that holds casting reel 9. The forward surface 81 of sinker lifter 8 relative to casting reel 9 has a streamlined shape to lessen drag resistance as rig 1 is being retrieved once it has been cast into body of water 11, and it is especially preferred that this shape is a bullet shape as shown in the Figures. Sinker lifter 8 has an internal bore 83 leading out to rear cavity 82 with mating surface 84 through which fishing line 6 is threaded. Internal bore 83 is sufficiently sized so that sinker lifter 8 is movably threaded to fishing line 6. Sinker weight 7 also has an internal bore 73 through which fishing line 6 is treaded. In preparing rig 1 for use, once sinker lifter 8 has been threaded to fishing line 6, sinker weight 7 is then threaded to fishing line 6, and then fishing line 6 is connected to a swivel 20 of leader line 4. The hook end 3 of leader line 4 is then connected to hook 2 to which bait 15 is then attached.

Rig 1 of the present invention is used in fishing by first casting the rig into a body of water 11, then allowing it to sink to the bottom 13 after it hits the surface of the water 12, and then retrieving rig 1 by reeling in fishing line 6 in casting reel 9, all of which is illustrated in FIGS. 1 through 5.

As rig 1 is being prepared to be cast, as shown in FIG. 1, the weight of sinker lifter 8 will cause it to sit on top of sinker weight 7 which itself is sitting on top of swivel 20. It is especially preferred that rear cavity 82 of sinker lifter 8 is sized to accommodate sinker weight 7 inside of it, with mating surfaces 74 and 84 mating with each other, since this creates a more stable rig 1 during casting, which helps allow for more pinpoint location of the placement of the cast in body of water 11. Indeed, when sinker lifter 8 and sinker weight 7 are so joined, the casting may be likened in terms of its placement as being more akin to what might be achieved with a fly fishing set up than with a traditional casting arrangement using a leader line with multiple weights or with a weight and a separate bobber which are separated from one another on the fishing line during casting.

Once rig 1 has been cast into body of water 11 and it hits surface 12 of water 11, rig 1 will begin to sink to the bottom 13. In order for sinker lifter 8 to sink, it must have a specific gravity greater than that of body of water 11, but it is preferable that it be approximately the same as that of body of water 11, so that sinker lifter 8 will lift off the bottom surface 13 when rig 1 is being retrieved. In contrast to sinker lifter 8, sinker weight 7 will have a specific gravity much higher than that of water (e.g., that of lead or another metal or metal alloy) so that it will cause rig 1 to rapidly sink to bottom 13. Because sinker weight 7 will sink faster than sinker lifter 8 in body of water 11 as shown in FIG. 2, and because both sinker weight 7 and sinker lifter 8 are movably threaded to fishing line 6 and able to move on fishing line 6, sinker weight 7 and sinker lifter 8 will be separated from one another when they land on bottom 13, which is illustrated in FIG. 3.

Figure 4:
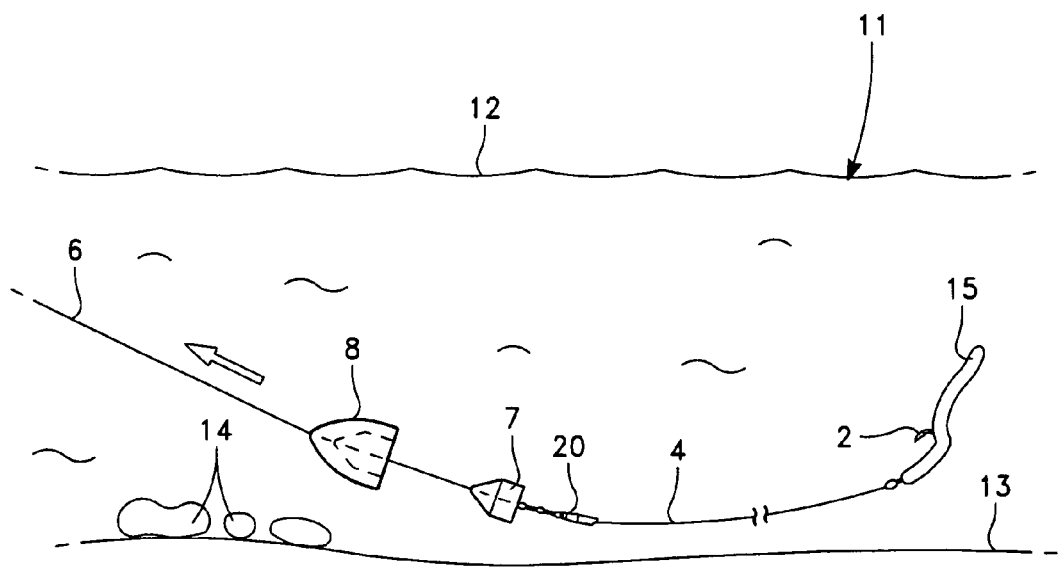
FIG. 4 illustrates the rig of FIG. 3 just after it has begun to be retrieved from the bottom of the body of water and the sinker weight is first lifted from the bottom.
Figure 5:
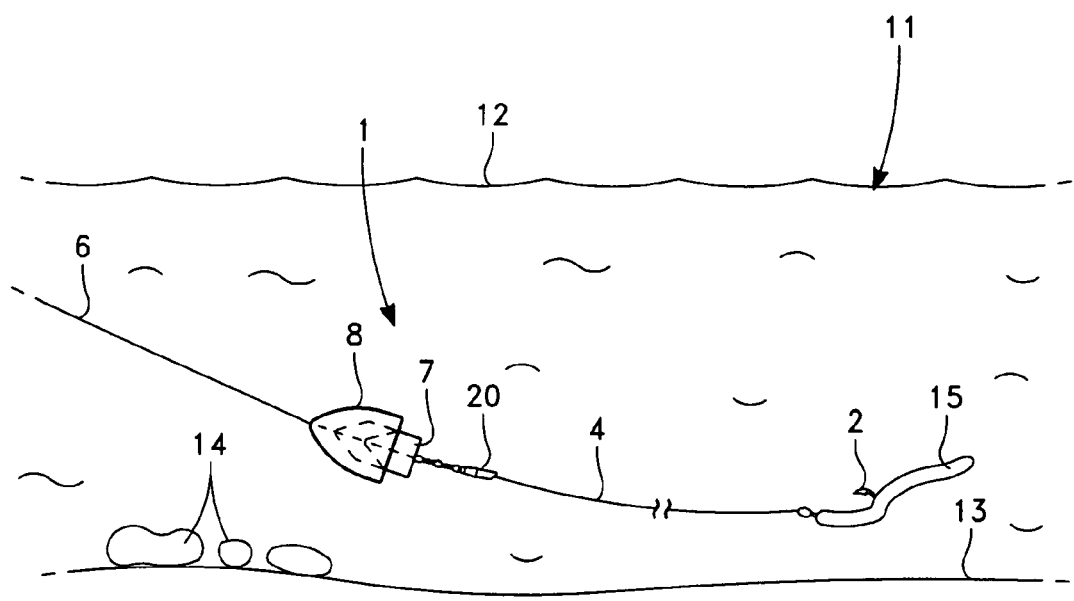
FIG. 5 illustrates the rig of FIG. 4 as it is being retrieved and after the sinker weight has entered the sinker lifter.
Figure 8:
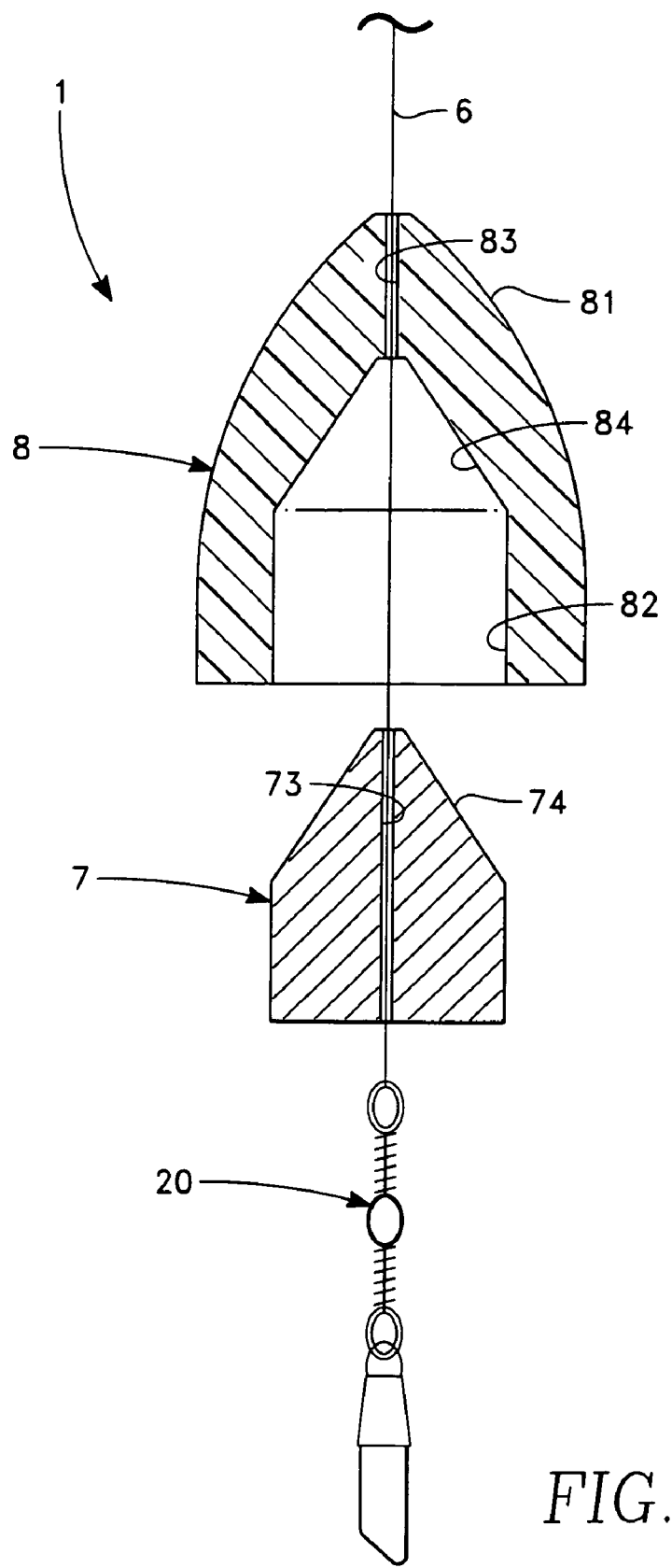

After rig 1 has been allowed to sink to bottom 13, it is retrieved by reeling fishing line 6 into casting reel 9. When this process begins, because sinker lifter 8 has a specific gravity approximately the same as water, it will lift off of bottom 13 due to the pull on fishing line 6, as shown in FIG. 4, which will lift rig 1 off of bottom 13, and then, as more fishing line 6 is reeled in, it will slide down fishing line 6 to mate with sinker weight 7 after sinker weight 7 has been pulled off of bottom 13, as shown in FIG. 5. As already noted, it is especially preferred that rear cavity 82 of sinker lifter 8 is sized to accommodate sinker weight 7 inside of it, with mating surfaces 74 and 84 mating with each other; however, even if sinker weight 7 is not wholly held within rear cavity 82, as long as it is at least partially held within rear cavity 82, there will be no open gap of fishing line 6 between sinker lifter 8 and sinker weight 7 to become snagged or broken during the retrieval process.

A key advantage of the present invention is the initial lift of sinker lifter 8, as opposed to what one would get with just a sinker weight 7, which helps to prevent snagging of rig 1 on rocks 14 or weeds, making it less likely to lose rig 1 during fishing. It is for this reason that applicant has decided to use the name "sinker lifter" since sinker lifter 8 sinks, in that it is heavier than water, which is required for it to sink to the bottom, yet it lifts off of the bottom, similar to what might be achieved with a bobber, once the fishing line is reeled in.

The streamlined shape of sinker lifter 8 also helps to prevent snags with rocks or weeds. Because it does have a streamline shape, and sinker weight 7 can be held within rear cavity 82, there is less chance of a snag that might otherwise happen with a weight. In addition, because sinker lifter 8 and sinker lifter 7 are preferably solid having internal bores 83 and 73 formed integral as a part of sinker lifter 8 and sinker weight 7, there is no longitudinal slit to be closed about a fishing line, as is typical with weights that are crimped to a fishing line, which, again, means there is one less non-streamlined surface to become snagged in weeds and the like. Also, when sinker weight 7 is held within rear cavity 82 of sinker lifter 8, there is only one object shape to become ensnared, instead of two separate shapes separated by a line, so snaring is less likely. In this regard, when there are two shapes separated by a fishing line, the line between the two shapes can become vulnerable to tangling or breakage, whereas such problems are avoided by the present invention.

While the invention has been described herein with reference to an especially preferred embodiment, this embodiment has been presented by way of example only, and not to limit the scope of the invention. Additional embodiments thereof will be obvious to those skilled in the art having the benefit of this detailed description, especially to meet specific requirements or conditions. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A rig for use with a fishing line, comprising:
   a hook;
   a leader line connected at a hook end to the hook;
   a swivel connected at one end to a leader end of the leader line and at its other end to the fishing line;
   a sinker weight movably threaded to the fishing line; and
   a sinker lifter movably threaded to the fishing line;
   wherein the sinker weight is located between the leader and the sinker lifter;
   wherein the sinker lifter has a first specific gravity greater than, but approximately, 1.0, such that the sinker lifter will sink when the rig is cast and allowed to sink to the bottom surface but will lift off the bottom surface when the fishing line is retrieved;
   wherein the sinker weight has a second specific gravity greater than the first specific gravity so that it will sink faster than the sinker lifter in a body of water; and
   wherein the sinker lifter and the sinker weight are independently movable on the fishing line such that they each can sink apart from each other on the fishing line in the body of water.

2. The rig of claim 1, wherein the sinker lifter has a forward surface shape that is streamlined for movement through water as the rig is retrieved.

3. The rig of claim 2, wherein the forward surface shape has a bullet shape.

4. The rig of claim 1, wherein the sinker lifter has a rear cavity that allows the sinker weight to at least partially enter the rear cavity when the rig is being retrieved.

5. The rig of claim 4, wherein the sinker weight is held substantially completely within the rear cavity when the rig is being retrieved.

6. The rig of claim 4, wherein the sinker weight has a mating surface designed to loosely fit within a corresponding mating surface of the rear cavity.

7. The rig of claim 6, wherein the sinker weight is loosely held substantially completely within the rear cavity when the rig is being cast.

8. The rig of claim 1, wherein both the sinker lifter and the sinker weight have an internal bore through which the fishing line is movably threaded.

9. A fishing rig, comprising:
a hook;
a fishing line;
a leader line connected to the hook;
a swivel connected at one end to the leader line and at its other end to the fishing line; and
a two piece weight system movably threaded to the fishing line;
wherein the two piece weight system is comprised of a first sinker weight and a second sinker lifter each of which has an internal bore through which it is independently threaded to the fishing line before the swivel is connected to the fishing line, the sinker weight being threaded to the fishing line between the sinker lifter and the swivel, the sinker weight having a specific gravity substantially greater than the sinker lifter, the sinker lifter having a specific gravity greater than, but approximately, 1.0, and both the sinker weight and the sinker lifter being independently movable on the fishing line.

10. The fishing rig of claim 9, wherein the sinker lifter has a forward surface shape that is streamlined for movement through water as the rig is retrieved and a rear cavity that allows the sinker weight to at least partially enter the rear cavity when the rig is being retrieved.

11. The fishing rig of claim 10, wherein the sinker weight is held substantially completely within the rear cavity when the rig is being retrieved.

12. The fishing rig of claim 11, wherein the sinker weight has a mating surface designed to fit within a corresponding mating surface of the rear cavity.

13. The fishing rig of claim 11, wherein the sinker weight is held substantially completely within the rear cavity when the rig is oriented in a vertical direction perpendicular to a top surface of a body of water from a point on the fishing line above where the internal bore through which the sinker lifter is independently threaded to the fishing line.

14. The fishing rig of claim 9, further comprising:
a fishing rod; and
a casting reel affixed to the fishing rod, the casting reel holding an end of the fishing line that is not connected to the swivel.

15. The fishing rig of claim 14, wherein neither the sinker lifter nor the sinker weight is removable from the fishing line while its ends are held by the casting reel and connected to the swivel.

\* \* \* \* \*